United States Patent
Ishino et al.

(10) Patent No.: US 9,465,566 B2
(45) Date of Patent: Oct. 11, 2016

(54) DEVICE MANAGEMENT APPARATUS, RELAY APPARATUS, RELAY METHOD, AND COMPUTER READABLE MEDIUM

(71) Applicant: FUJI XEROX CO., LTD., Tokyo (JP)

(72) Inventors: Shigeki Ishino, Yokohama (JP); Shinichiro Yamamoto, Kawasaki (JP); Takahiro Okayasu, Sagamihara (JP); Teppei Aoki, Kamakura (JP); Masamune Oshitani, Tokyo (JP); Chad Eickhoff, Clackamas, OR (US); Geoff Goodman, Portland, OR (US); Russell Neville, Portland, OR (US)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 14/657,162

(22) Filed: Mar. 13, 2015

(65) Prior Publication Data

US 2016/0224291 A1    Aug. 4, 2016

(30) Foreign Application Priority Data

Jan. 30, 2015 (JP) ................. 2015-016802

(51) Int. Cl.
*G06F 15/00* (2006.01)
*G06K 1/00* (2006.01)
*G06K 15/00* (2006.01)
*G06F 3/12* (2006.01)
(Continued)

(52) U.S. Cl.
CPC .......... *G06F 3/1238* (2013.01); *G06F 3/1207* (2013.01); *G06F 3/1222* (2013.01); *G06F 3/1236* (2013.01); *G06F 3/1286* (2013.01); *H04L 63/10* (2013.01); *H04L 67/04* (2013.01)

(58) Field of Classification Search
CPC .. G06F 3/1238; G06F 3/1286; G06F 3/1236; G06F 3/1207; G06F 3/1222; H04L 67/04

USPC ..................... 358/1.1, 1.15, 1.14
See application file for complete search history.

(56) References Cited

U.S. PATENT DOCUMENTS 8,332,494 B2 * 12/2012 Sakai ..................... 709/221
9,155,114 B2 * 10/2015 Ochiai
(Continued)

FOREIGN PATENT DOCUMENTS

JP    2013-522774 A    6/2013
WO    2011115987 A2   9/2011

OTHER PUBLICATIONS

Communication dated Feb. 15, 2016 issued by the Australian Patent Office in counterpart Australian Patent Application No. 2015201636.

*Primary Examiner* — Douglas Tran
(74) *Attorney, Agent, or Firm* — Sughrue Mion, PLLC

(57) ABSTRACT

A relay apparatus includes: a first transmission unit that transmits first information specifying the relay apparatus to the management apparatus through a network, in response to the relay apparatus being connected to the network; a collection unit that collects management information regarding a management target device, from the management target device connected to the network, in which the collection unit does not collect the management information from the management target device until an activation instruction is received from the management apparatus, and starts to collect the management information from the management target device only after the activation instruction is received from the management apparatus; and a second transmission unit that transmits the collected management information to the management apparatus.

12 Claims, 6 Drawing Sheets

(51) Int. Cl.
  *H04L 29/08* (2006.01)
  *H04L 29/06* (2006.01)

(56) References Cited

U.S. PATENT DOCUMENTS

2004/0170460 A1* 9/2004 Mokuya ............... G06F 3/121
                                                    400/76
2009/0164495 A1* 6/2009 MacLeod ............... H04L 12/24
2010/0211995 A1   8/2010 Yoshida
2012/0182570 A1*  7/2012 Robinson ............... H04L 12/58
                                                    358/1.13
2013/0246599 A1   9/2013 Yan
2014/0007199 A1   1/2014 Ishino
2014/0289531 A1   9/2014 Yamakawa
2014/0289798 A1   9/2014 Kaneshiro

* cited by examiner

FIG. 2

| RELAY APPARATUS ID | ADMINISTRATOR ID (E-MAIL ADDRESS) | GROUP (MANAGEMENT UNIT) | DEVICE NAME | MODEL NAME | COUNT VALUE | STATE |
|---|---|---|---|---|---|---|
| 0001 | Yamamoto@example.com | AB DEVELOPMENT DEPARTMENT, 7TH FLOOR | Printer-A | Prt123 | 1250 SHEETS | NORMAL |
|  |  |  | Printer-B | Prt124 | 945 SHEETS | OUT-OF-TONER |
| 0002 | Yamamoto@example.com | AB DEVELOPMENT DEPARTMENT, 8TH FLOOR | Printer-P | Prt125 | 789 SHEETS | FAILURE |
|  |  |  | Printer-Q | Prt123 | 345 SHEETS | NORMAL |
|  |  |  | Printer-R | Prt123 | 456 SHEETS | SLEEP |
| 0023 | Suzuki@example.com | ADMINISTRATION DEPARTMENT | Printer-X | Prt125 | 235 SHEETS | FAILURE |
|  |  |  | Printer-Y | Prt124 | 468 SHEETS | NORMAL |
|  |  |  |  |  |  |  |

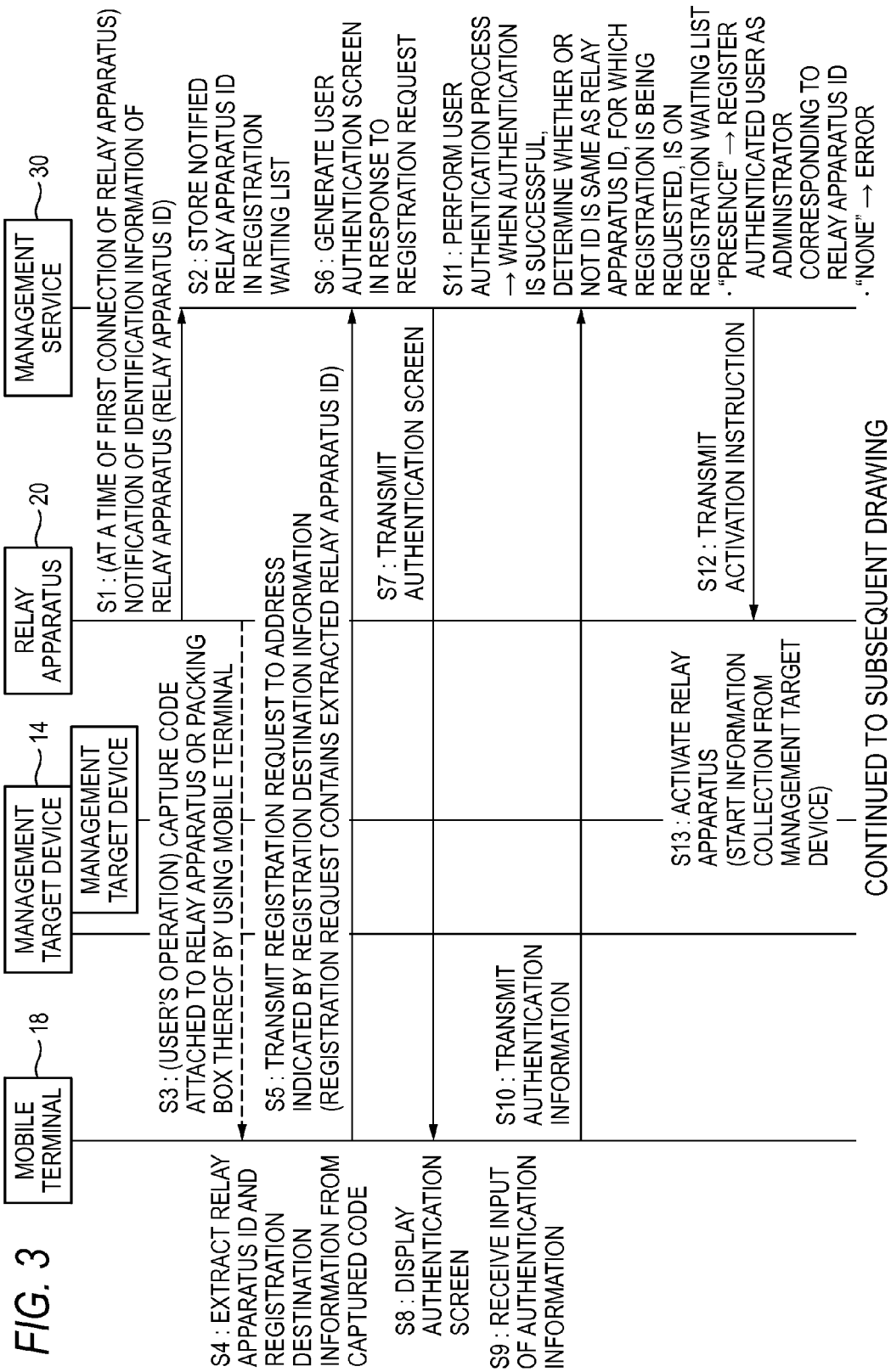

DEVICE MANAGEMENT APPARATUS, RELAY APPARATUS, RELAY METHOD, AND COMPUTER READABLE MEDIUM

CROSS-REFERENCE TO RELATED APPLICATIONS

This application is based on and claims priority under 35 USC 119 from Japanese Patent Application No. 2015-016802 filed on Jan. 30, 2015.

BACKGROUND

1. Technical Field

The present invention relates to a device management apparatus, a relay apparatus, a relay method, and a computer readable medium.

2. Related Art

Devices such as printers and the like present in a local area network are used or managed, through a service on the Internet such as a cloud printing service. In a case of using this type of service, it is necessary to register the device to a service. In the case of a device equipped with an input and output mechanism such as a display screen or a button, necessary information is input on an input user interface for registration (for example, a web page) provided from the management apparatus by using the input and output mechanism, and therefore it is possible to register the device to the management apparatus. Further, in the case of a device equipped with a print mechanism, information for registration such as identification information is transmitted from a management apparatus to the device and is printed, and information indicating a print result is input from a terminal equipped with the input and output mechanism (for example, a personal computer or a smartphone) and is transmitted to the management apparatus, and therefore it is possible to register the device to the management apparatus.

SUMMARY

An aspect of the present invention provides a device management system including: a management apparatus; and a relay apparatus, in which the relay apparatus includes: a first transmission unit that transmits first information specifying the relay apparatus to the management apparatus through a network in response to the relay apparatus being connected to the network; a collection unit that collects management information regarding a management target device, from the management target device connected to the network; and a second transmission unit that transmits the collected management information to the management apparatus, and in which the management apparatus includes: a first reception unit that receives the first information from the relay apparatus; a second reception unit that receives authentication information regarding a user and second information specifying the relay apparatus that the user intends to register, from a terminal device that is operated by the user, in which the second information is read from the relay apparatus or accessories of the relay apparatus; a memory that stores the user as an administrator of the relay apparatus, when the user is authenticated as an authorized user based on the received authentication information and the received first information and the received second information specify the same relay apparatus; and a providing unit that provides information including the management information received from the relay apparatus, to the administrator corresponding to the relay apparatus stored in the memory.

BRIEF DESCRIPTION OF THE DRAWINGS

Exemplary embodiment(s) of the present invention will be described in detail based on the following figures, wherein:

FIG. 2 is a diagram illustrating an example of data stored in a database of a management service;

FIG. 3 is a diagram illustrating a flow of the device registration method of the embodiment;

DETAILED DESCRIPTION

Figure 1:
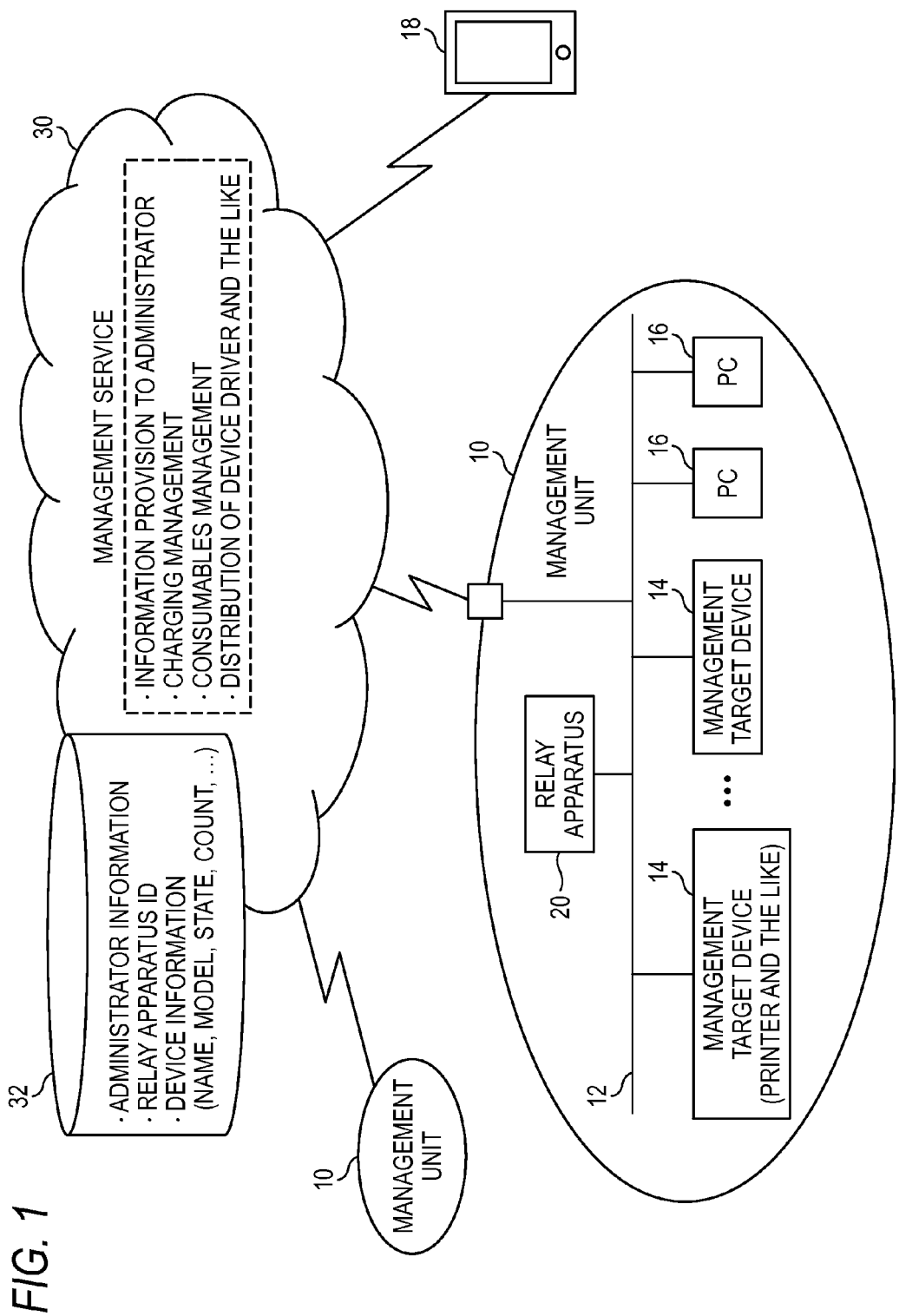
FIG. 1 is a diagram illustrating an example of a device management system to which a device registration method of an embodiment is applied.

A description will be made regarding an example of a device management system to which a device registration method of an embodiment of the present invention is applied, with reference to FIG. 1.

The device management system includes a relay apparatus 20 provided in a management unit 10, and a management service 30 provided outside the management unit 10.

The management unit 10 is an array (an organization of users utilizing the devices) of computers and other devices that perform data communication through a local network 12 such as a local area network (LAN) or an intranet, and is, for example, an office, a factory, a home, or the like. The relay apparatus 20 is connected to the local network 12. One or more management target devices 14 and one or more personal computers (PC) 16 are connected to the local network 12. The local network 12 may be either a wired system or a wireless system, or a combination thereof. The local network 12 is connected to the Internet (not illustrated), through a firewall, a gateway, or the like.

The management target device 14 is a device to be managed by the device management system, and is, for example, a printer, a multifunction machine (a multifunction device equipped with a copy function, a printing function, a scanning function, and the like), a scanner, a facsimile, or the like. Various types and various models of management target devices 14 can be connected to the local network 12. The PC 14 uses the management target devices 14 through the local network 12.

The relay apparatus 20 collects information necessary for managing from each management target device 14 on the local network 12, and supplies the collected information to the management service 30. Further, the relay apparatus 20 may have a function of receiving the updated version of firmware for each model of the management target device 14 on the local network 12 and the updated version of a device driver such as a printer driver used for controlling each model by the PC 16 from the management service 30. In this case, the relay apparatus 20 holds the received updated versions of the firmware and the device driver in order to respectively install them in the corresponding management target device 14 and PC 16.

It is also conceivable to install a program having a function of the relay apparatus 20 described herein in a certain PC 16 connected to the local network 12, and use the PC 16 as the relay apparatus 20. However, in the present embodiment, as an example, the relay apparatus 20 which is configured as a dedicated device is used, in view of the convenience of the operation and the robustness of the relay apparatus itself. When the relay apparatus 20 is configured as a dedicated device, since the relay apparatus 20 may execute a limited program necessary for the device management system, the hardware performance such as a CPU performance and a memory capacity may not be so high, and the relay apparatus 20 may be made as a relatively small and inexpensive device. Further, since the relay apparatus 20 does not execute an unspecified program which is not expected in advance, a failure is less likely to occur, and there is basically no need for the user to perform maintenance. Further, since the provision of information to the user is performed from the management service 30 through the Internet, the relay apparatus 20 is not equipped with a user interface (UI) such as a display screen or an input device.

The management service 30 which is provided on the Internet collects information regarding each management target device 14 through the Internet from the relay apparatus 20 in each management unit 10, and provides services to each management unit 10 by using the device information. The management service 30 may be a single server device, or a system including plural computers such as a cloud computing system. An example of the services provided by the management service 30 includes a service of providing information collected by the management unit 10 (for example, a state, usage, and the like of each management target device 14) and secondary information obtained by analyzing the information, to the administrator of the management unit 10. The administrator of a certain management unit 10 logs in to the management service 30 by using the mobile terminal 18 such as a smartphone or a tablet terminal or a PC, and browses the information regarding the management unit 10. Further, the management service 30 may provide one or more services, out of management of charging for the use of the management target device 14, management of the remaining amount of consumables of each management target device 14, distribution of the latest version of a device driver and firmware, and setting of various types of setting information for the management target device 14. Of course, these are merely examples, and the management service 30 can provide various other services using the collected information.

The management service 30 includes a database 32 that manages information regarding each management unit 10. Information regarding the administrator of each management unit 10 (for example, the user ID of the administrator, and the like), identification information regarding the relay apparatus 20 in the management unit 10 (referred to as "relay apparatus ID"), device information regarding the management target device 14 in each management unit 10, and the like are registered to the database 32.

FIG. 2 illustrates an example of data registered in the database 32. In this example, the user ID (administrator ID) of the administrator who manages the relay apparatus 20, the name (for example, a "group" name) of the management unit 10 in which the relay apparatus 20 is provided, and the device information regarding each management target device 14 in the management unit 10 are registered in the database 32, in association with the relay apparatus ID of each relay apparatus 20. In this example, an e-mail address of the administrator is used as an administrator ID. Further, the device information includes the name and the model name of the management target device 14 ("printer name"), a count value indicating the print output number of the management target device 14, and information indicating the operation state ("state") of the management target device 14. In addition, address information regarding the relay apparatus 20 is held in the database 32 for communication with the relay apparatus 20, but the illustration is omitted in order to avoid complexity.

In the example of FIG. 2, for example, the relay apparatus 20 having the relay apparatus ID of "0001" is registered in association with the administrator whose user ID is "Yamamoto@example.com", and is provided in a group (management unit) of "AB development department, 7th floor". Further, two management target devices 14 of the names of "Printer-A" and "Printer-B" are connected to the local network 12 connected to the relay apparatus 20, and the model names thereof are respectively "Prt123" and "Prt124". Further, at present, the "Printer-A" is in a "normal" state, but the "Printer-B" is in an "out-of-toner" state.

Further, in the example of FIG. 2, two management units 10 corresponding to two relay apparatuses "0001" and "0002" are managed by the same administrator "Yamamoto@example.com".

In the case of starting the operation of the relay apparatus 20 while installing the relay apparatus 20 in the management unit 10, it is necessary to register the corresponding relationship between the relay apparatus 20 and the management unit 10 to the management service 30. If the relay apparatus 20 has a UI, a registration screen is displayed on the UI of the relay apparatus 20 from the management service 30 and the administrator inputs necessary information on the registration screen, such that it is possible to register the corresponding relationship between the relay apparatus 20 and the management unit 10. However, in a case of using the relay apparatus 20 that is configured as a dedicated device without a UI, the registration method using the UI is not available. Therefore, in the embodiment, a machine-readable printed code indicating the relay apparatus ID and the like of the relay apparatus 20 is associated in advance with the relay apparatus 20, and the registration job of the corresponding relationship is supported by the code.

In other words, in the embodiment, the relay apparatus 20 is associated with a printed code containing information such as the relay apparatus ID. For example, a code is printed on the relay apparatus 20 itself, a seal having a code printed therein is attached, the relay apparatus 20 is delivered to the user while the relay apparatus 20 is packed in a packing box having a code printed therein, or the relay apparatus 20 is delivered to the user while a card having a code printed therein and the relay apparatus 20 are shipped in the same packing box. If the user allows the relay apparatus 20 to be connected the local network 12, the relay apparatus 20 transmits the identification information regarding the relay apparatus 20 (relay apparatus ID) to the management service 30. Further, if the user reads the code on the relay apparatus 20 or the accessories (a packing box, a card shipped therewith, and the like) by using a terminal such as a smartphone, the terminal accesses the management service 30, transmits the relay apparatus ID read from the code, and makes a request for user authentication. If the user authentication is successful, the management service 30 compares the relay apparatus ID received from the terminal with the relay apparatus ID which has been received before from the relay apparatus 20, and if they match, the management service 30 determines the request as a legitimate registration request, and registers the relay apparatus ID to the database 32. Further, the authenticated user is registered to the database 32 as an administrator corresponding to the relay apparatus ID.

Hitherto, an overview of a registration process of the relay apparatus 20 in the embodiment has been described. Next, a description will be made regarding a detailed example of a procedure of registering a corresponding relationship between the management unit 10 and the relay apparatus 20 with reference to FIG. 3 and FIG. 4.

Prior to this procedure, the administrator of the management unit 10 receives the relay apparatus 20 sent by the operator of the management service 30. A unique relay apparatus ID that has been assigned to the relay apparatus 20 and address information of the management service 30 (an IP address, a uniform resource locator (URL), or the like) has been written in advance in the non-volatile storage device in the relay apparatus 20. Further, the sent relay apparatus 20 is associated with a code representing a relay apparatus ID and information regarding a registration destination of the above-described corresponding relationship. The information regarding the registration destination is, for example, a URL that is called in the registration process provided by the management service 30. Further, the code associated with the relay apparatus 20 is a machine-readable printed code representing the information such as the above-described relay apparatus ID. As such a code, a code representing information as an image, for example, one-dimensional bar code or two-dimensional bar code may be used. For example, since most of the mobile terminals 18 such as smartphones and tablet terminals have a function (software) of recognizing a QR (registered trademark) code, accessing the URL indicated by the code, and transmitting information contained in the code to the URL, and hereinafter, an example in which the QR code is used as a code associated with the relay apparatus 20 will be described. In addition, as long as the code associated with the relay apparatus 20 is machine-readable, the code is not limited to an image code such as the QR code. For example, the code may be a numeric or alphabetic string of a form that can be recognized with high accuracy by an optical character recognition (OCR). Further, the association between the code and the relay apparatus 20 may be performed, for example, by attaching a seal having the code to the relay apparatus 20, or packing the relay apparatus 20 with a packing box having the code printed therein or attached.

The procedure of FIG. 3 and FIG. 4 will be described in order of step numbers which are illustrated. First, a description will be made with reference to FIG. 3.

(S1) An administrator who manages a device group of the management unit 10 takes out the relay apparatus 20 that has been sent by the management service 30 from a packing box, and connects the relay apparatus 20 to the local network 12. The relay apparatus 20 corresponds to a protocol for the management service 30 to manage the device from the remote site, and can communicate with the management service 30 by using the protocol. As such a protocol for remote management, for example, TR-069 is known (however, it is not limited thereto). The relay apparatus 20 stores the address of the management service 30, and is connected to the local network 12. If the relay apparatus 20 is activated, it makes a request of a session establishment to the management service 30, and establishes a session. If a communication session is established with the management service 30, the relay apparatus 20 notifies the management service 30 of its own identification information, in other words, a relay apparatus ID, through the Internet.

(S2) After the communication session is established with the relay apparatus 20, the management service 30 stores the relay apparatus ID transmitted from the relay apparatus 20, in a registration waiting list (not illustrated). The registration waiting list is a list that stores the relay apparatus ID transmitted from an unregistered relay apparatus 20. In addition, if the registration of the association with the management unit 10 is completed in the subsequent process, it is deleted from the registration waiting list.

(S3) In contrast, the administrator reads a QR code attached to the packing box in which the relay apparatus 20 has been entered, by using a camera of the mobile terminal 18, for example, according to an installation work procedure set forth in a manual that has been shipped in the packing box.

(S4) The mobile terminal 18 (more strictly, a QR code recognition application installed therein) extracts a relay apparatus ID, and a registration destination URL for accessing a relay apparatus registration process of the management service 30, from the read QR code.

(S5) The mobile terminal 18 transmits an access request to the extracted registration destination URL. The access request contains a relay apparatus ID extracted from the QR code. For example, in the process, a QR code recognition application of the mobile terminal 18 activates a web browser, and the web browser accesses the registration destination URL written in hypertext markup language (HTTP).

(S6) The management service 30 activates the relay apparatus registration process, in response to an access request from the mobile terminal 18 to the registration destination URL. In the registration process, the relay apparatus ID contained in the access request is temporarily stored, and a user authentication screen is generated.

(S7) The relay apparatus registration process of the management service 30 returns the generated user authentication screen to the mobile terminal 18 which is a request source. The user authentication screen includes an input field for inputting authentication information such as a user account (ID) and a password.

(S8) The mobile terminal 18 (strictly, a web browser installed therein) displays the received user authentication screen.

(S9) The mobile terminal 18 receives an input of authentication information (for example, an account and a password) from the user (in other words, the administrator of the management unit 10). In addition, it is assumed that the administrator of the management unit 10 completes the user registration to the management service 30 in advance, and authentication information such as the user account and the password is registered in the management service 30.

(S10) The mobile terminal 18 transmits the input authentication information to the relay apparatus registration process of the management service 30.

(S11) The management service 30 performs user authentication based on the transmitted authentication information, and if the user authentication is successful, searches for a relay apparatus ID matching the relay apparatus ID received from the mobile terminal 18 in step S6 from the registration waiting list. If the matching relay apparatus ID is not found from the registration waiting list, an error process (for example, a process of returning a screen notifying the mobile terminal 18 of an error) is performed. If the matching relay apparatus ID is found from the registration waiting list, authenticated user's account is registered as the administrator ID corresponding to the relay apparatus ID, to the database 32.

Thus, the relay apparatus 20 provided in the local network 12 in the management unit 10 and the user who executes the QR code reading operation are associated in the management service 30. Thereafter, the user becomes the administrator of the relay apparatus 20. The user (administrator) logs in to the management service 30, and can browse the information (a count value, a state, and the like, see FIG. 2) regarding each management target device 14 collected by the relay apparatus 20 and other types of information obtained by analyzing the information.

In addition, after the registration, an input screen for inputting the identification name of the management unit 10 including the relay apparatus 20 may be provided on the mobile terminal 18, and a string that the administrator inputs on the input screen may be registered as an identification name of the management unit corresponding to the relay apparatus ID (in the example of FIG. 2, a "group" name) to the database 32.

(S12) If the administrator is correctly registered in step S11, the management service 30 transmits information for instructing activation, to the relay apparatus 20 associated with the administrator in the registration process. The transmission of an activation instruction may be performed by using the above-described protocol for remote management. In addition, the activation instruction may be generated based on the instruction from the administrator and transmitted to the relay apparatus 20. In other words, for example, the management service 30 transmits a screen for inputting whether or not to activate the relay apparatus 20 to the mobile terminal 18, and when "activation" is input on the screen, the activation instruction may be transmitted to the relay apparatus 20.

(S13) If the relay apparatus 20 receives the activation instruction from the management service 30, it activates the function of the relay apparatus 20. By the activation, the relay apparatus 20 collects information from the management target device 14 on the local network 12, and starts a process of notifying the management service 30 of the collected information.

The flow of a process after the activation will be described with reference to FIG. 4.

(S14) The activated relay apparatus 20 transmits a request for acquiring device information to the management target device 14 on the local network 12. In the process of the acquisition request, for example, the relay apparatus 20 multicasts or broadcasts packets to the connected local network 12, identifies individual devices connected to the local network 12 based on the packets that are returned from the individual devices on the local network 12 in response to the packets, and recognizes the identified devices as the management target devices 14. Here, the packet that is returned from each device on the local network 12 contains the type and address of the device. In addition, the relay apparatus 20 receives a reply packet from devices on the local network 12 other than a printer and a multifunction device, for example, the PC 16 and a household electrical appliance (a television). The relay apparatus 20 may recognize all these various types of devices as the management target devices 14, or recognize only predetermined specific types of devices (for example, a printer or a multifunction device) as the management target devices 14.

If each management target device 14 on the local network 12 is recognized, the relay apparatus 20 makes a request for device information (a model name or a device name, optional configuration information, state information, and the like) regarding the management target device 14 to each management target device 14. The request is made, by using, for example, a simple network management protocol (SNMP).

(S15) Each management target device 14 transmits its own device information to the relay apparatus 20. For example, each management target device 14 includes a database termed a management information base (MIB), holds its own device information in the MIB, and updates the contents depending on a change in a state (for example, an increase in the number of outputs). The management target device 14 returns the device information in the MIB in response to the acquisition request from the relay apparatus 20. The relay apparatus 20 stores the device information acquired from each management target device 14.

(S16) The relay apparatus 20 transmits the stored device information regarding each management target device 14 to the management service 30. Here, the relay apparatus 20 may transmit the device information in association with its own relay apparatus ID.

(S17) The management service 30 registers the device information regarding each management target device 14 received from the relay apparatus 20 in the field corresponding to the relay apparatus ID of the relay apparatus 20 in the database 32.

At the time when the management service 30 issues the activation instruction to the relay apparatus 20, the information regarding the management target device 14 on the same local network 12 as in the relay apparatus 20 is not present at all in the database 32 of the management service 30. However, if the management service 30 receives the device information that is first collected by the relay apparatus 20 from the relay apparatus 20 that is activated in response to the activation instruction, the management service 30 recognizes the name, the model, and the like of each management target device 14 on the same local network 12 as in the relay apparatus 20, and registers the information in the database 32. Further, if the device information regarding each management target device 14 that is received from the relay apparatus 20 contains information such as a count value and a device state (see FIG. 2), the information is also registered in the database 32.

Through the above process, the relay apparatus 20 provided in the management unit 10 is registered in association with the administrator, in the management service 30. After the registration, if the administrator logs in to the management service 30, the administrator is able to browse the states of respective management target devices 14 of one or more management units 10 that the administrator manages.

Figure 4:
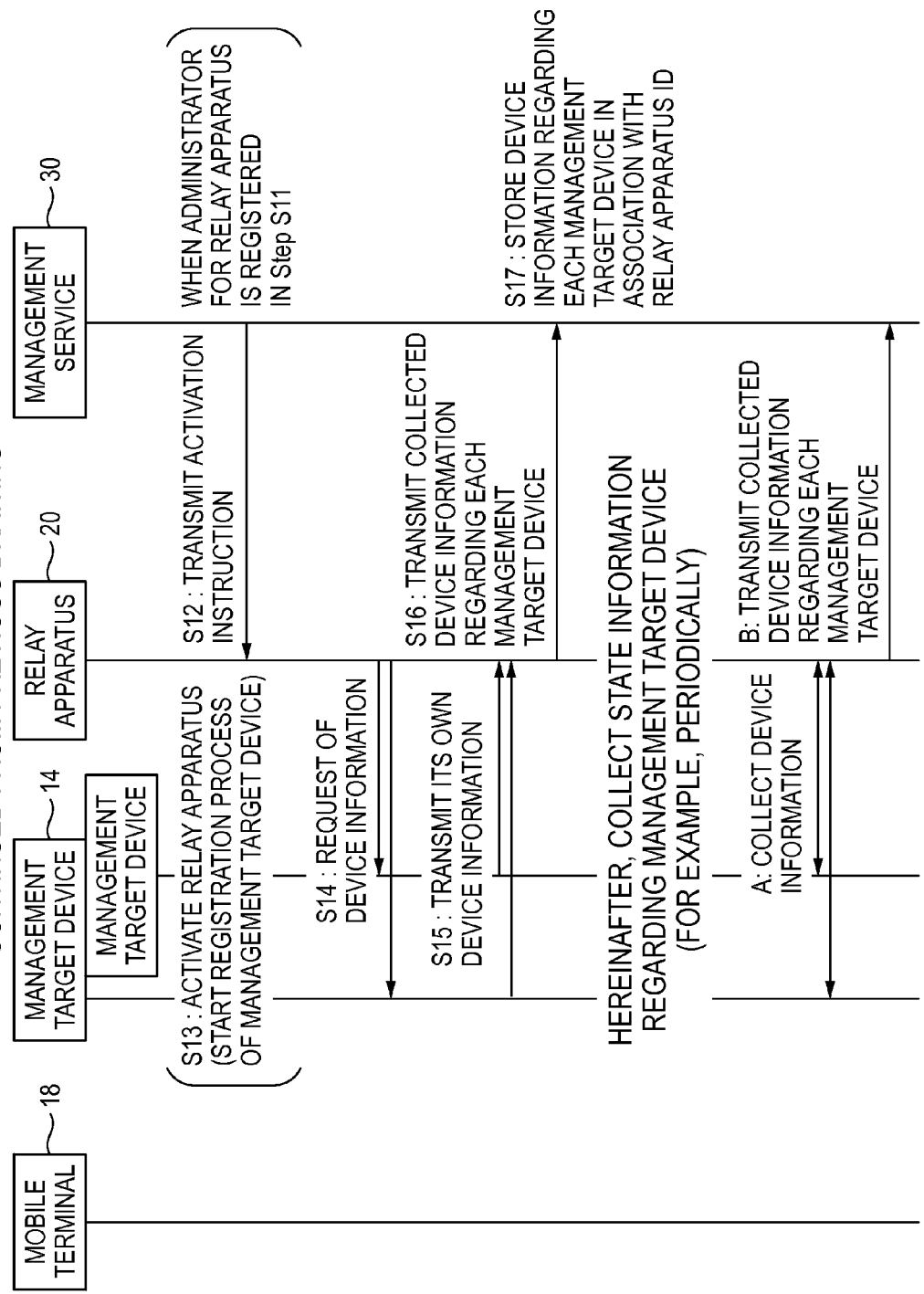
FIG. 4 is a diagram illustrating an operation of a system after a relay apparatus is registered to a management service.

The flow of the process after registering the relay apparatus 20 to the management service 30 is as illustrated in the latter part of FIG. 4. In other words, the relay apparatus 20 collects device information from each management target device 14 on the local network 12 in step A, and notifies the management service 30 of the collected device information in step B.

In other words, the relay apparatus 20 periodically acquires information from the management target device 14, by periodically using, for example, an SNMP protocol. The acquired information includes a count value of the number of print outputs, the state information regarding the management target device 14, and the like.

Further, each management target device 14 may be set to notify the relay apparatus 20 of the occurrence of a predetermined event, if the event occurs. The event to be reported includes a change in a state of consumables such as an "out-of-paper" state or an "out-of-toner" state, failure in the device, and the like.

Then, the relay apparatus 20 transmits the information collected from each management target device 14 in this manner to the management service 30, autonomously, or in response to the request from the management service 30.

Further, the management service 30 may have a function of performing the setting of the management target device 14 on the same local network 12 as in the relay apparatus 20 through the relay apparatus 20 that has been registered or updating the setting. If the setting of notification at the time of the occurrence of an event in the management target device 14 described above is taken as an example, for example, it is assumed that the management service 30 provides a setting menu screen for the management unit 10 corresponding to the administrator, to the administrator (of the mobile terminal 18, and the like), and the administrator can instruct turning on or off of the setting of the above-described event notification on a screen. The instruction of turning on or off may be a batch for all management target devices 14 in the management unit 10, or may be individually given to each management target device 14. The management service 30 that has received an instruction transmits an instruction of turning on or off the setting of the event notification, to the relay apparatus 20 in a target management unit 10, by using the protocol for remote management. The relay apparatus 20 updates the setting of the event notification in the management target device 14 which is a target of the instruction on the local network 12, according to the instruction.

Here, the setting of the event notification is taken as an example, but it is possible to set other setting items for the management target device 14 through the relay apparatus 20 from the management service 30, or change the setting value, in the same manner.

The information such as the device information or the setting information regarding the management target device 14 is stored, for example, in the MIB held by the management target device 14, and the management service 30 updates the collection and setting of the state information, by performing reading and writing to the MIB through the relay apparatus 20.

Further, the management service 30 has a function of updating the firmware of the relay apparatus 20, by using the protocol for remote management. Further, when detecting the update of firmware corresponding to the model of a certain management target device 14 in the management unit 10, the management service 30 may acquire the updated version data, and update the firmware of the management target device 14 through the relay apparatus 20 in the management unit 10 by the acquired updated version data. In this case, the management service 30 transmits the acquired updated version data to the relay apparatus 20 by the protocol for remote management, and the relay apparatus 20 stores the received updated version data. The relay apparatus 20 may install the stored updated version data in the corresponding management target device 14 in a push method, or transmit the updated version data in response to a download request from the corresponding management target device 14. In the latter case, for example, the management service 30 provides information indicating the update of the firmware of the management target device 14, to the administrator of the management unit 10 (for example, on the web page for the administrator), and if the administrator who receives the information operates the management target device 14, the updated version is downloaded from the relay apparatus 20 and installed.

The management service 30 generates a screen (for example, a web page) displaying information regarding each management target device 14 which is collected through the relay apparatus 20 and information obtained by processing the information. If the administrator logs in to the management service 30 from the mobile terminal 18, a screen displaying such information is provided to the administrator.

Figure 5:
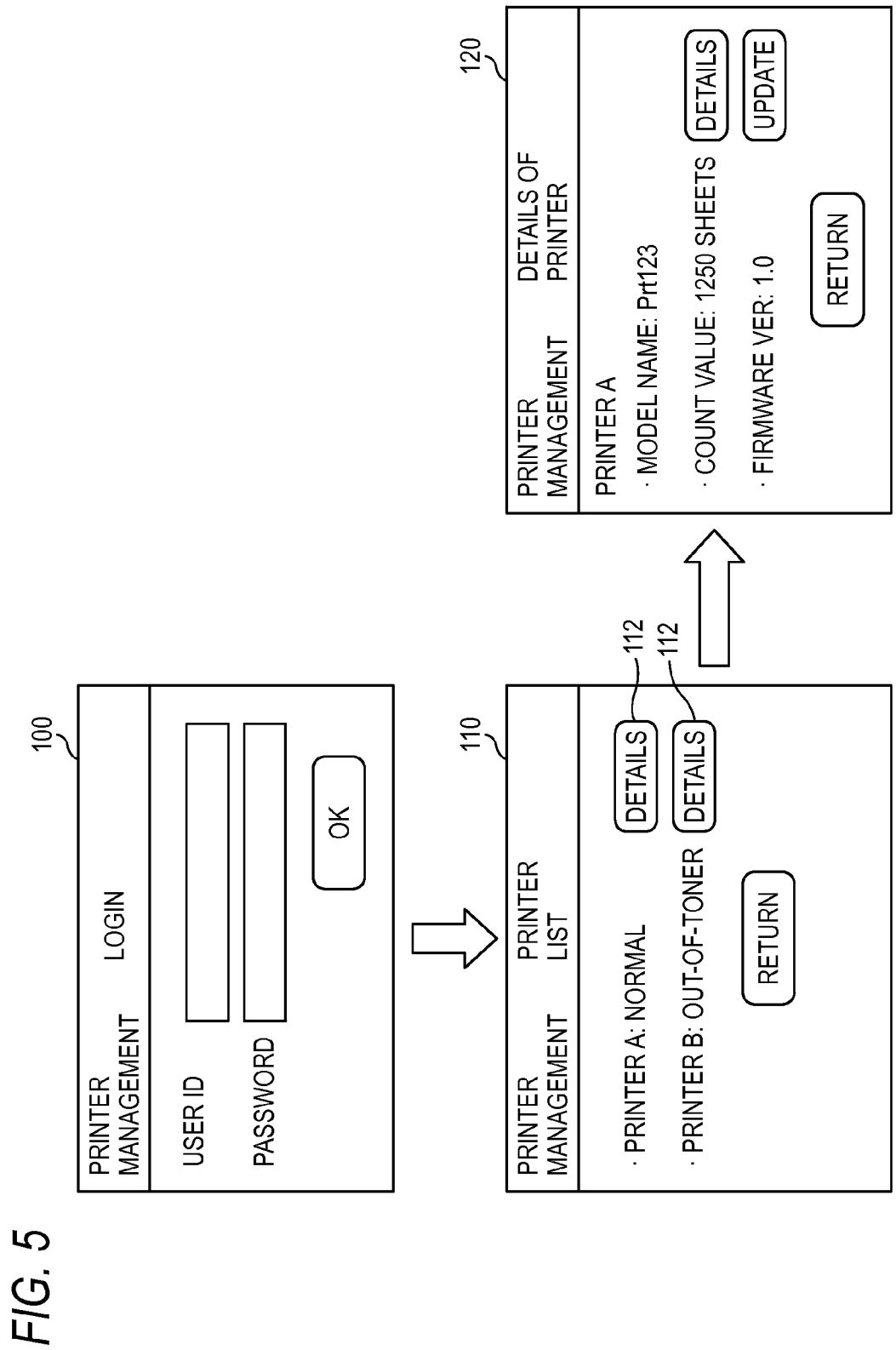
FIG. 5 is a diagram illustrating an example of a user interface screen that the management service provides to a mobile terminal of an administrator.

For example, if the administrator accesses the management service 30 from the mobile terminal 18, a login screen 100 illustrated in FIG. 5 is provided to the mobile terminal 18 from the management service 30. If the administrator inputs its own authentication information (in this example, a user ID and a password) to the login screen 100 displayed on the mobile terminal 18, and transmits the screen, the management service 30 determines whether the authentication information is legitimate, and if it is legitimate, the management service 30 provides a device list screen 110 displaying the state of each management target device 14 associated with the ID of the administrator to the mobile terminal 18. A screen displaying a list of the management units 10 which are managed is first provided to the administrator who manages the plural management units 10, and if the administrator selects the management unit 10 that the administrator wants to browse on the screen, the device list screen 110 of the selected management unit 10 may be provided.

The name and the state of each management target device 14, and a button 112 for calling a detailed-information screen of each management target device 14 are displayed on the device list screen 110 illustrated in FIG. 5. If the administrator touches any button 112, the detailed-information screen 120 of the management target device 14 corresponding to the button is provided to the mobile terminal 18 from the management service 30. The name and the model name of the management target device 14, the count value, the version of the firmware which is installed at present are displayed on the detailed-information screen 120 illustrated in FIG. 5. The administrator can obtain a screen displaying the details of a count value, such as when and who prints what number of sheets, by touching the details button displayed on the right side of the count value. Further, when the management service 30 acquires a newer version than the version of the current firmware of the management target device 14, an update button on the right side of the version number of the firmware on the detailed-information screen 120 is activated. If the administrator touches the update button, an update instruction of the firmware of the management target device 14 is transmitted from the mobile terminal 18 to the management service 30. The management service 30 that has received the instruction transmits the update data of the firmware of the management target device 14 to the relay apparatus 20 corresponding to the management target device 14, and instructs the execution of an update process.

Without being illustrated, a stop/resume user interface (UI) for instructing stopping and resuming of the use of the management target device 14 may be provided in the detailed-information screen 120 and the like of the management target device 14, such that the administrator operates the UI so as to be able to make the management target device 14 be in a use stopped state or to resume the management target device 14 (transition to an available state) from the use stopped state. The instruction of stopping and resuming is transferred to the management target device 14 through the relay apparatus 20 from the management service 30.

Further, for example, the setting screen of the management target device 14 is requested from the detailed-information screen 120 of each management target device 14, and thus the administrator may change various setting items of the management target device 14 in this setting screen. Information related to setting change instructed from administrator is transmitted from the management service 30 to the relay apparatus 20, and the relay apparatus 20 changes the settings of the corresponding management target device 14 in accordance with the information.

Next, an example of functional configurations of respective devices constituting the system of the embodiment will be described with reference to FIG. 6.

Figure 6:
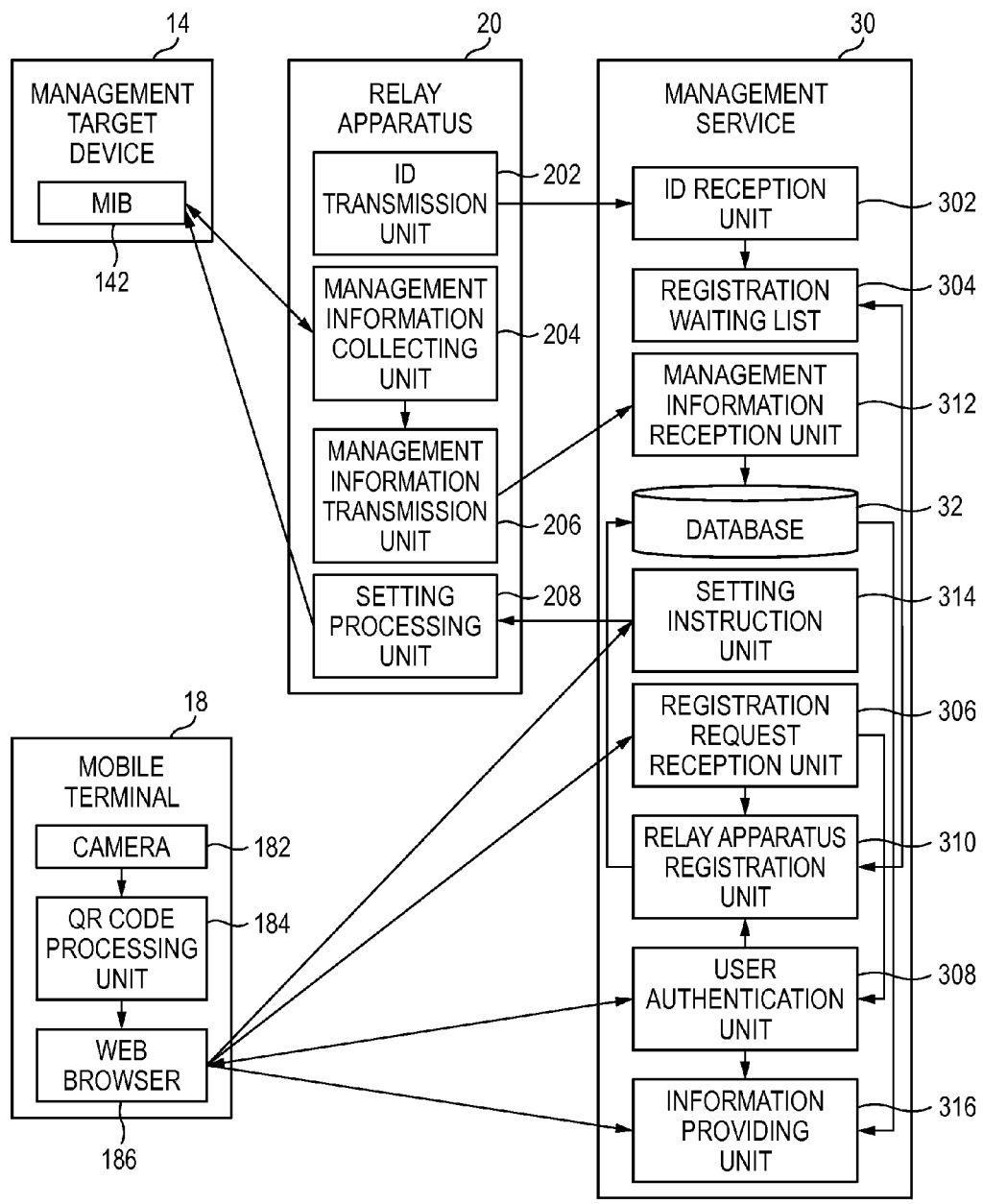
FIG. 6 is a diagram illustrating an example of functional configurations of respective devices constituting the device management system.

In the example of FIG. 6, the management target device 14 includes an MIB 142 that holds management information for managing its own management. The management information contains, for example, information for specifying the management target device 14 (an ID, a name, a model name, and the like), information for specifying software installed in the management target device 14 (firmware version, and the like), information indicating the state of the management target device 14 (a count value, an operation state such as an executing state/a failure state, and the like), and various types of setting information. The information regarding the MIB 142 can be referred to by other devices (for example, the relay apparatus 20) on the same local network 12, and the relay apparatus 20 can rewrite specific information out of the information.

The mobile terminal 18 includes a camera 182, and a QR code processing unit 184 which is an application of decoding the QR code captured by the camera 182. The QR code processing unit 184 delivers the information obtained by decoding the QR code, for example, information such as the URL of the management service 30 and the relay apparatus ID which are obtained by decoding the QR code of the packing box of the relay apparatus 20, for example, to the web browser 186. The web browser 186 transmits the information such as the relay apparatus ID to the URL (management service 30).

The relay apparatus 20 includes an ID transmission unit 202, a management information collecting unit 204, a management information transmission unit 206, and a setting processing unit 208. When the relay apparatus 20 is connected to the network, the ID transmission unit 202 transmits a registration request containing a relay apparatus ID (not illustrated) stored by the relay apparatus 20 to the management service 30. In addition, the relay apparatus 20 may hold information indicating whether or not an activation instruction has been received from the management service 30, or may transmit a registration request to the management service 30 only when the information indicates non-receipt. The management information collecting unit 204 collects management information by using an SNMP and the like, from the 14 connected to the same local network 12 as in the relay apparatus 20 (particularly, for example, the MIB 142). The management information transmission unit 206 transmits the management information regarding each management target device 14 that the management information collecting unit 204 collects, to the management service 30. The data format of the management information may be the same as the data format of the acquired management information from the respective management target device 14. The acquired management information from the respective management target devices 14 may be collectively contained by generating data in CSV (Comma Separated Vaule) format or XML (eXtensible Markup Language) format. The setting processing unit 208 performs setting or change of the target setting items in the MIB 142 of the management target device 14 which is a target of the instruction, in response to the setting instruction from the 314 of the management service 30. Further, the setting processing unit 208 may receive update data of the firmware or the device driver for the management target device 14, from the management service 30, and perform a process for reflecting the update data to the management target device 14 or the PC 16.

In the management service 30, the ID reception unit 302 receives a registration request containing a relay apparatus ID, from the ID transmission unit 202 of the relay apparatus 20. If the relay apparatus ID contained in the registration request is once held in the registration waiting list 304, and thereafter, is registered in the database 32 by the relay apparatus registration unit 310, it is deleted from the registration waiting list 304. If receiving a registration request through the web server of the management service 30 (not illustrated), from the web browser 186 of the mobile terminal 18, the registration request reception unit 306 requests the registration process by passing the relay apparatus ID that is contained in the registration request to the relay apparatus registration unit 310, and activates the user authentication unit 308. The user authentication unit 308 provides an authentication screen to the web browser 186 of the mobile terminal 18 through the web server, and acquires the authentication information such as the user name and password that the user has input on the authentication screen. Then, the user is authenticated through a known authentication process such as comparison of the authentication information with the user information registered in the management service 30. When the user turns out to be a legitimate user which has been registered in the management service 30 through the authentication process, the user authentication unit 308 passes the user ID of the user to the relay apparatus registration unit 310. The relay apparatus registration unit 310 registers the user ID in the database 32 by associating the user ID with the relay apparatus ID that has been received from the registration request reception unit 306. Further, when the relay apparatus ID is registered in the database 32, the relay apparatus registration unit 310 transmits an activation instruction to the relay apparatus 20 associated with the relay apparatus ID.

Information regarding each relay apparatus 20 illustrated in FIG. 2 is registered in the database 32. The management information reception unit 312 reflects the management information received from the management information transmission unit 206 of the relay apparatus 20 in the information regarding the relay apparatus 20 in the database 32. For example, the count value and the state of the management target device 14 in the database 32 are updated according to the count value and the state of each management target device 14 included in the received management information. The setting instruction unit 314 provides the setting screen of the management target device 14 to the user, and transmits an instruction to update the setting screen to the setting information input by the user, to the corresponding relay apparatus 20. In the relay apparatus 20 that has received this instruction, the setting processing unit 208 performs the setting change for the corresponding management target device 14. The information providing unit 316 provides a screen for management illustrated in FIG. 5 to the user, and provides the management information regarding each management target device 14 stored in the database 32, according to the instruction from the user for the screen.

The functions of the system described with reference to FIG. 1 to FIG. 5 are realized by combining the element groups described with reference to FIG. 6.

Hitherto, one embodiment of the present invention has been described.

Modification 1

In the processing sequence of the embodiment described above, the user who first performs a registration work (if there is a user account in the management service 30) is to be registered in the management service 30 as an administrator of the relay apparatus 20. Therefore, a user who is not a person originally supposed to be the administrator also becomes an administrator. The following method is considered as a countermeasure against such a problem.

In this method, information regarding the association between the relay apparatus ID of the relay apparatus 20 and the user who is supposed to become the administrator of the relay apparatus 20 is registered in advance in the management service 30. For example, when the administrator of the management unit 10 (a person who is supposed to become the administrator) applies for the sending of the relay apparatus 20 to the operator of management service 30, the user ID of the administrator is transferred to the management service 30 side, the management service 30 stores the information regarding the association between the user ID and the relay apparatus ID of the relay apparatus 20 that is supposed to be sent in the registration reservation list in response thereto, and the relay apparatus 20 is sent to the management unit 10. Then, when someone executes the process of FIG. 3 on the relay apparatus 20 that has reached the management unit 10, if the relay apparatus IDs transmitted to the management service 30 in steps S2 and S6 match and the combination of the relay apparatus ID and the user ID that is authenticated in step S11 is stored in the registration reservation list of the management service 30, the management service 30 stores the user ID as the administrator of the relay apparatus ID in the database 32. In contrast, if the combination of the relay apparatus ID and the user ID is stored in the registration reservation list, the registration to the database 32 is not performed, and an error screen is returned to the user's terminal.

In the processing sequence (FIGS. 3 and 4) of the embodiment described above, after the process up to step S11 is completed and the administrator and the relay apparatus 20 associated has been properly registered, it is also conceivable that someone may read the same QR code and make a request for the administrator registration. If there are a second and subsequent requests for administrator registration, the management service 30 refuses the registration, and returns the error screen to the requesting user. Further, in this case, the management service 30 may notify the administrator that has been registered that there are duplicate requests for administrator registration, through an e-mail or a screen provided to the administrator which logs in. Further, in such a case, since there is a concern for unauthorized use of the relay apparatus 20, the relay apparatus 20 may be stopped in response to an instruction from the management service 30.

Further, in the processing sequence of FIG. 3 and FIG. 4, if association between the relay apparatus 20 and the administrator is registered in step S11, the management service 30 automatically enables the relay apparatus 20 in the next step S12. Instead thereof, the administrator may first receive an instruction of enabling the relay apparatus 20, and transmit the activation instruction to the relay apparatus 20 from the management service 30. For example, the management service 30 may provide a screen for instructing enabling/disabling (operation stop) to each relay apparatus 20 that is managed by the administrator, to the administrator, and transmit the enabling/disabling instruction to the relay apparatus 20 that is a target of instruction, in response to the enabling/disabling instruction of the administrator on the screen.

Modification 2

Further, when the management unit 10 is moved, it is assumed to clear first the information which has been registered in the management service 30 (database 32) in association with the relay apparatus 20, and register the information again after moving, due to a reason that the IP address of the relay apparatus 20 is changed or the management target device 14 is replaced before and after moving. Further, even when there is no longer a certain management unit 10 and thus the relay apparatus 20 that has been used is used again for another management unit 10, it becomes necessary to collectively update the registration information for the relay apparatus 20 that has been registered to the management service 30.

In order to cope with such cases, the management service 30 may provide a UI screen for instructing the relocation of the relay apparatus 20 to the administrator. If the administrator has made a relocation instruction through this screen, the management service 30 sends a print job of a QR code for re-registration to any printer on the same local network 12 as the relay apparatus 20 (management target device 14 of the printer type), through the relay apparatus 20. The QR code for re-registration contains information indicating the presence of re-registration, in addition to the relay apparatus ID of the relay apparatus 20 and the URL of the relay apparatus registration process. After the completion of the print of the QR code for re-registration, the management service 30 transmits an operation stop instruction to the relay apparatus 20. The administrator connects the relay apparatus 20 to the local network 12 of the moving destination or the reuse destination of the relay apparatus 20, and the registration processing procedure of FIGS. 3 and 4 is performed. In step S3 of the processing procedure, the administrator allows the mobile terminal 18 to read the print-out QR code for re-registration. The mobile terminal 18 transmits the information recognized from the QR code to the management service 30 (step S5 in FIG. 3). At this time, information indicating the presence of re-registration is also transmitted. The management service 30 recognizes from the information that an object of this access is re-registration of the relay apparatus 20, and executes the re-registration process. A registration request performed by reading the QR code printed on the packing box after administrator registration is rejected as duplicate registration as described above or received as a re-registration request in the case of reading the QR code for re-registration issued in response to the relocation instruction as in this example. Then, the management service 30 first clears the registration information in the database 32 corresponding to the corresponding relay apparatus ID, in response to the re-registration request, executes the process of step S6 and the subsequent processes, and registers again the information acquired through this process in the database 32 in association with the relay apparatus ID.

Modification 3

Further, a malicious person can access another local network 12 by using the relay apparatus 20 and collect information regarding each device on the local network 12, but the following countermeasure against such a situation is considered.

In one method, when it is detected that the devices of the number of a predetermined ratio or more are replaced, among the group of devices connected to the local network 12, the relay apparatus 20 determines that there is a possibility that a fraud of reconnecting the relay apparatus 20 to another local network has been made. In this determination, for example, the relay apparatus 20 periodically checks the IP address of each device on the local network 12, and compares a set of IP addresses of a group of devices that are detected during the previous check with a set of IP addresses of a group of devices that are detected during the present check. Then, for example, a ratio of the number of IP addresses that match with each other between both sets relative to the total number of IP addresses of both sets is calculated, and when the ratio is below the predetermined threshold, it is determined that there is a possibility of fraud.

In another example, when the IDs of the devices of a predetermined ratio or number or more are changed, among the predetermined servers or devices which characterize the network used by the relay apparatus 20, it is determined that there is a possibility that a fraud has been made. Examples of the servers or the devices which characterize the network include a domain name system (DNS) server, a dynamic host configuration protocol (DHCP) server, and a gateway. The IDs may be IP addresses, MAC addresses, vendor-inherent identification information, and the like. In this example, the relay apparatus 20 periodically checks the IDs of the characteristic servers and devices, and determines whether or not the ratio or the number of the devices of which IDs have been changed satisfies a determining condition for the presence of the possibility of a fraud.

In either example, when it is determined that there is a possibility of a fraud, the relay apparatus 20 performs a handling process against the fraud. An example of the handling processing is a process of notifying the management service 30 that there is a possibility of unauthorized access and stopping and disabling the relay apparatus 20.

Further, in the example illustrated in FIG. 3 and FIG. 4, it is assumed that the relay apparatus ID that is sent by the relay apparatus 20 to the management service 30 (step S1 in FIG. 3) and the relay apparatus ID that is read by the mobile terminal 18 from the QR code associated with the relay apparatus 20 and is sent to the management service 30 are the same value. However, it is not essential that both the relay apparatus IDs have the same value. In principle, it is sufficient for both the relay apparatus IDs to specify the same relay apparatus 20, and the values may be different from each other. For example, in step S1 of FIG. 3, the relay apparatus 20 may transmit the combination of items sufficient to specify a predetermined device among information items stored in the MIB (for example, a value obtained by arranging values such as a device name, a model name, a vender name, and a serial number in a predetermined order) to the management service 30, and the QR code associated with the relay apparatus 20 may contain a hash value of the value of the combination as information for specifying the relay apparatus 20. In this example, a combination of items that relay apparatus 20 sends in step S1 and the hash value indicated by the QR code are different in values, but the former hash value and the latter hash value are compared, such that the relay apparatus 20 can determine whether or not both indicate the same relay apparatus 20.

The relay apparatus 20 and the management service 30 which are exemplified above may be realized by causing a computer to execute a program representing the process of each functional module of the device. The computer herein has a circuit configuration, for example, as hardware, in which a microprocessor such as a CPU, a memory (primary storage) such as a random access memory (RAM) and a read only memory (ROM), a secondary storage controller for controlling the secondary storage such as a hard disk drive (HDD), a solid state drive (SSD), a flash memory, various input and output (I/O) interfaces, and a network interface for performing control for the connection with the wireless or wired network are connected through, for example, a bus. Further, a disk drive for reading and/or writing to a portable disc recording medium such as a CD, a DVD, a Blu-ray disc, a memory writer for reading and/or writing to transportable nonvolatile recording media of various standards such as a flash memory, and the like may be connected to the bus through, for example, the I/O interface. A program having the processing contents of each functional module illustrated above described therein is saved in a secondary storage device such as a flash memory, through a recording medium such as a CD or DVD or communication means such as a network, and is installed in the computer. The functional modules exemplified above can be realized by the program stored in the secondary storage device being loaded to the RAM and executed by a microprocessor such as the CPU.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A device management system comprising:
   a management apparatus; and
   a relay apparatus,
   wherein the relay apparatus includes:
      a first transmission unit configured to transmit first information specifying the relay apparatus to the management apparatus through a network in response to the relay apparatus being connected to the network;
      a collection unit configured to collect management information regarding a management target device, from the management target device connected to the network; and
      a second transmission unit configured to transmit the collected management information to the management apparatus, and
   wherein the management apparatus includes:
      a first reception unit configured to receive the first information from the relay apparatus;
      a second reception unit configured to receive authentication information regarding a user and second information specifying the relay apparatus that the user intends to register, from a terminal device that is operated by the user, wherein the second information is read from the relay apparatus or accessories of the relay apparatus;
      a memory configured to store the user as an administrator of the relay apparatus, when the user is authenticated as an authorized user based on the received authentication information and the received first information and the received second information specify the same relay apparatus; and a providing unit configured to provide information including the management information received from the relay apparatus, to the administrator corresponding to the relay apparatus stored in the memory.

2. The device management system according to claim 1, wherein the collection unit is configured to not collect the management information from the management target device until an activation instruction is received from the management apparatus, wherein the collection unit is configured to start to collect the management information from the management target device only after the activation instruction is received from the management apparatus, and wherein the management apparatus further includes an instruction transmission unit configured to transmit the activation instruction to the relay apparatus, when the user is authenticated as an authorized user based on the received authentication information and the received first information and the received second information specify the same relay apparatus.

3. The device management system according to claim 1, wherein the management apparatus further includes a scheduled administrator memory configured to store a scheduled user as the administrator of the relay apparatus, and wherein the memory is configured to not store a user as the administrator of the relay apparatus, when the user corresponding to the received authentication information is not stored in the scheduled administrator memory.

4. The device management system according to claim 1, wherein the management apparatus further includes:

an issuing unit configured to issue re-registration information for enabling re-registration of the relay apparatus, when an instruction of relocation of the relay apparatus corresponding to the administrator is received from the administrator; and an re-registering unit configured to re-register the relay apparatus in the memory unit, when the first reception unit receives the first information regarding the relay apparatus that is already stored in the memory and the re-registration information is received from a user's terminal device.

5. The device management system according to claim 1, wherein the relay apparatus is configured to perform notification to the management apparatus and is configured to stop collecting at least the management information, when devices of a number or more satisfying a determination standard are changed, among a set of other devices on a network connected to the relay apparatus.

6. A management apparatus comprising:

a first reception unit configured to receive first information from a relay apparatus, the first information specifying the relay apparatus;

a second reception unit configured to receive authentication information regarding a user and second information specifying the relay apparatus that the user intends to register, from a terminal device that is operated by the user, wherein the second information is read from the relay apparatus or accessories of the relay apparatus;

a memory configured to store the user as an administrator of the relay apparatus, when the user is authenticated as an authorized user based on the received authentication information received and the received first information and the received second information specify the same relay apparatus; and a providing unit configured to receive management information of a management target device collected by the relay apparatus through a network from the relay apparatus, and configured to provide information including the received management information to the administrator corresponding to the relay apparatus stored in the memory.

7. The management apparatus according to claim 6, further comprising:

an instruction transmission unit configured to transmit an activation instruction to the relay apparatus, when the user is authenticated as the authorized user based on the received authentication information, and the received first information and the received second information specify the same relay apparatus.

8. A management method comprising:

receiving first information from a relay apparatus, the first information specifying the relay apparatus;

receiving authentication information regarding a user and second information specifying the relay apparatus that the user intends to register, from a terminal device that is operated by the user, wherein the second information is read from the relay apparatus or accessories of the relay apparatus;

storing in a memory the user as an administrator of the relay apparatus, when the user is authenticated as an authorized user based on the received authentication information received and the received first information and the received second information specify the same relay apparatus;

receiving management information of a management target device collected by the relay apparatus through a network from the relay apparatus; and providing information including the received management information to the administrator corresponding to the relay apparatus stored in the memory.

9. A non-transitory computer readable medium storing a program causing a computer to execute a process for management, the process comprising:

receiving first information from a relay apparatus, the first information specifying the relay apparatus;

receiving authentication information regarding a user and second information specifying the relay apparatus that the user intends to register, from a terminal device that is operated by the user, wherein the second information is read from the relay apparatus or accessories of the relay apparatus;

storing in a memory the user as an administrator of the relay apparatus, when the user is authenticated as an authorized user based on the received authentication information received and the received first information and the received second information specify the same relay apparatus;

receiving management information of a management target device collected by the relay apparatus through a network from the relay apparatus; and providing information including the received management information to the administrator corresponding to the relay apparatus stored in the memory.

10. A relay apparatus comprising:

a first transmission unit configured to transmit first information specifying the relay apparatus to a management apparatus through a network, in response to the relay apparatus being connected to the network;

a collection unit configured to collect management information regarding a management target device, from the management target device connected to the network, wherein the collection unit is configured not collect the management information from the management target device until an activation instruction is received from the management apparatus, and wherein the collection unit is configured to start to collect the management information from the management target device only after the activation instruction is received from the management apparatus; and a second transmission unit configured to transmit the collected management information to the management apparatus.

11. A relay method comprising:

transmitting first information specifying a relay apparatus to a management apparatus through a network, in response to the relay apparatus being connected to the network;

collecting management information regarding a management target device, from the management target device connected to the network, wherein the management information from the management target device is not collected until an activation instruction is received from the management apparatus, and wherein the collecting of the management information from the management target device is started only after the activation instruction is received from the management apparatus; and transmitting the collected management information to the management apparatus.

12. A non-transitory computer readable medium storing a program causing a computer to execute a process for relay, the process comprising:

transmitting first information specifying a relay apparatus to a management apparatus through a network, in response to the relay apparatus being connected to the network;

collecting management information regarding a management target device, from the management target device connected to the network, wherein the management information from the management target device is not collected until an activation instruction is received from the management apparatus, and wherein the collecting of the management information from the management target device is started only after the activation instruction is received from the management apparatus; and transmitting the collected management information to the management apparatus.

\* \* \* \* \*